No. 618,671. Patented Jan. 31, 1899.
L. HEIDT.
MOLD FOR PRISM TILES.
(Application filed Oct. 24, 1898.)

(No Model.)

WITNESSES:
William M. Miller
Chas. E. Poensgen

INVENTOR
Louis Heidt

BY
Hauff & Hauff
ATTORNEYS

UNITED STATES PATENT OFFICE.

LOUIS HEIDT, OF NEW YORK, N. Y.

MOLD FOR PRISM-TILES.

SPECIFICATION forming part of Letters Patent No. 618,671, dated January 31, 1899.

Application filed October 24, 1898. Serial No. 694,398. (No model.)

*To all whom it may concern:*

Be it known that I, LOUIS HEIDT, a citizen of the United States, residing at New York, (Brooklyn,) in the county of Kings and State of New York, have invented new and useful Improvements in Molds for Prism-Tiles, of which the following is a specification.

By means of this invention prism tiles or lights can be obtained which are of uniform size or weight and uniformly or perfectly finished, as set forth in the following specification and claim and illustrated in the annexed drawings, in which—

Figure 1:
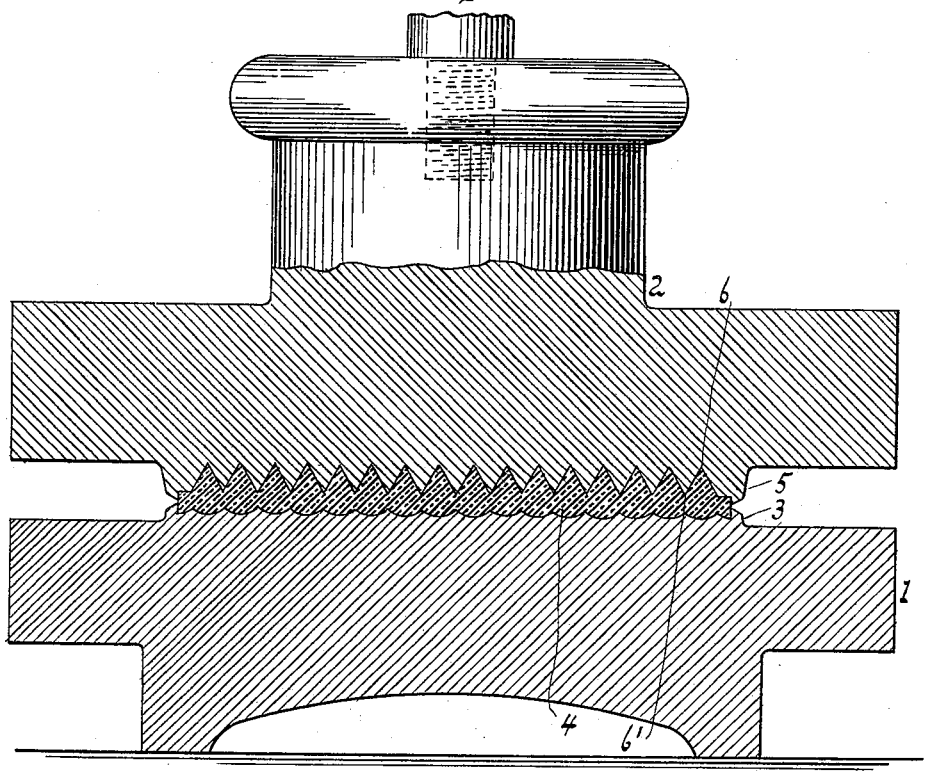
Figure 2:
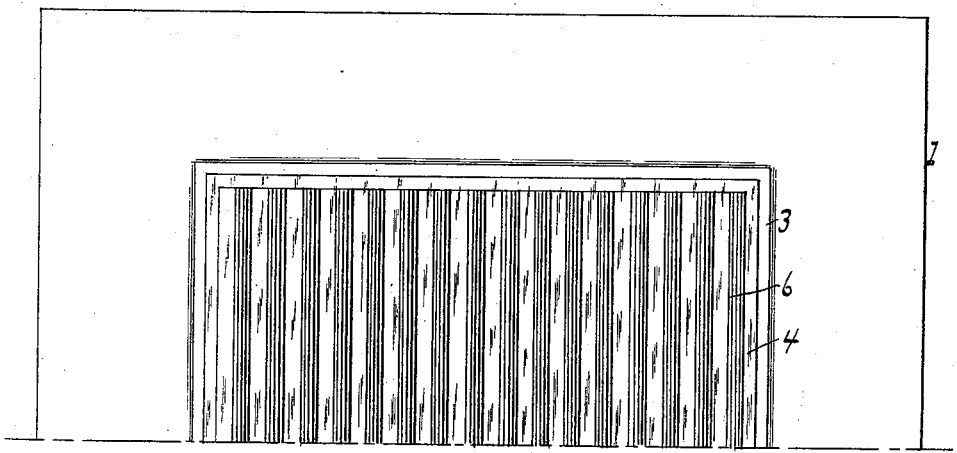

Figure 1 is a sectional elevation of the mold. Fig. 2 is a plan view of the molded article resting on the bottom or mold portion.

The bottom or mold portion proper is shown at 1 and the plunger or former at 2. The bottom portion 1 is shown with an edge or rim 3 projecting or rising therefrom, and the material or molten glass 4 is placed or poured onto the bottom 1 inside rim 3. The plunger 2 also has a rim 5, and as the plunger presses down onto the bottom 1 any surplus material will escape from the mass 4 between the rims 3 and 5, so that only a uniform or fixed quantity of material remains to be molded between the parts 1 and 2. Should an excess of material thus be supplied to the bottom 1, such excess escaping, as explained, will reduce the remaining material to the desired quantity. At the same time air escapes with the surplus material flowing off, so that the finished article is clear or free from bubbles or imperfections.

The contacting edges of rims 3 and 5 are sharp or cutting, so as to trim or cut off the escaping or surplus material from the molded article, and any bur or roughness about such article can be removed by a suitable finishing process or tool, such as a diamond or glass-cutter wheel.

The molded article is shown with prisms the apexes of which are shown at 6. The plunger 2 is suitably ridged or guttered to form such prisms as it descends or presses down onto the mass. Said plunger 2 being made to descend onto the material 4 on the bottom portion 1, such plunger will not prematurely chill or harden the upper face or portion of the material which is to be prismed, as the plunger does not contact with the material prior to commencing the molding or pressure. Such unchilled portion of the material is thus enabled to work well up between the ridges 6' on the plunger, so as to form sharp or clean prisms or ridges 6.

The bottom one may be plane or given a wavy or other shape according to the character desired for the under face of the molded article. In the drawings the article or mass 4 is shown prismed on one face and wavy on the other; but the waves could of course be omitted and this lower face formed plane or otherwise, as required. The overflow over edge 3 can take place entirely about the mass, as the edges 3 and 5 are extended about the bottom and plunger. The escape of surplus material is thus uniform or takes place where needed.

What I claim as new, and desire to secure by Letters Patent, is—

A mold comprising a former and a bottom portion, said former and said bottom portion having registering sharpened ribs or projections defining the outline of the article to be molded, and depressions in each which extend from said sharpened ribs to the outer edges of each part of the mold, as and for the purpose set forth.

In testimony whereof I have hereunto set my hand in the presence of two subscribing witnesses.

LOUIS HEIDT.

Witnesses:
W. C. HAUFF,
E. F. KASTENHUBER.